(12) United States Patent
Leupold

(10) Patent No.: US 7,161,452 B1
(45) Date of Patent: Jan. 9, 2007

(54) MAGNET FOR A FARADAY ROTATOR

(75) Inventor: Herbert A. Leupold, Eatontown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/076,457

(22) Filed: Mar. 2, 2005

(51) Int. Cl.
*H01F 7/02* (2006.01)
*G02F 1/09* (2006.01)

(52) U.S. Cl. .................. 335/306; 359/280; 359/282

(58) Field of Classification Search ........ 335/296–306; 359/280–283
See application file for complete search history.

(56) References Cited

U.S. PATENT DOCUMENTS 5,087,984 A * 2/1992 Heiney et al. ............. 359/282
5,382,936 A * 1/1995 Leupold et al. ............ 335/306

* cited by examiner

*Primary Examiner*—Ramon M. Barrera
(74) *Attorney, Agent, or Firm*—Michael Zelenka; George B. Tereschuk

(57) ABSTRACT

Augmented magic sphere rotator permanent magnetic structures are provided by augmenting a magic sphere augmented with an interior magnet that attains significant decreases in mass, bulk and length of the optically active element. Also provided is a multiple augmented magic sphere rotator permanent magnetic structure with two augmented magic spheres positioned in tandem that provides an advantageously significant reduction in mass. The augmented magic sphere rotator permanent magnetic structures of the present invention provide the desirable advantages of specifically decreased mass and bulk of the structure and decreased total length of the optically active elements. The augmented magic sphere rotator permanent magnetic structure and multiple augmented magic sphere rotator permanent magnetic structure can be used as Faraday rotator structures.

18 Claims, 3 Drawing Sheets

$B_r = 12.0 kG$

MAGNET FOR A FARADAY ROTATOR

GOVERNMENT INTEREST

The invention described herein may be manufactured, used, and licensed by or for the United States Government for governmental purposes without payment to me of any royalties thereon.

FIELD OF THE INVENTION

The present invention relates to permanent magnets. More particularly, the present invention relates to devices and apparatus that provide a more compact and efficient field source for Faraday optical rotators.

BACKGROUND OF THE INVENTION

The magneto-optic effect, also known as the Faraday effect, was first described by Michael Faraday in 1845 and occurs in most optically transparent dielectric materials, including liquids, when they are subject to strong magnetic fields. The magneto-optic effect, manifested as an induced optical activity, is able to rotate the plane of polarization of an input optical beam that propagates parallel to the direction of the magnetic field in the material. The strength of the magneto-optic effect is given by the formula:

$$\theta = BVl \quad (1)$$

where theta is the angle of rotation; B is the magnetic field; V is the Verdet constant for the material and l is the effective length of material contained within the magnetic field. Unlike the electro-optic effect, the magneto-optic effect causes a true rotation of the plane of polarization for any input polarization angle. In a simple electro-optic device, only pure rotations of 90° are available; all other intermediate voltages produce different degrees of elliptical polarization states from a linear input state, but a Faraday rotator will truly rotate the plane of input polarization through any angle, so long as a sufficiently strong magnetic field is provided.

In optical devices it is frequently necessary to rotate the polarization of an input optical beam. Rotating the polarization can be accomplished by the use of optically active materials, i.e. materials that exhibit different indices of refraction for circularly polarized beams in which the both the electric and magnetic vectors rotate in opposite senses. A plane polarized beam can be considered to be the vector sum of two circularly polarized beams of opposite sense, if the beams travel at different speeds because of the different indices of refraction then their relative phase changes and their sum is a plane polarized vector, which rotates about the axis of propagation. Thus, optically active materials can change the polarization direction of plane-polarized beams that travel through them when they have been exposed to a strong magnetic field. The amount by which a polarization is rotated depends on three factors: (1) the strength of the magnetic field; (2) the distance the beam travels in the material; and (3) an internal property of a material whose rotating strength is measured by the Verdet constant. The rotational angle is the product of these three factors, as in Equation 1.

Thus, after the optimal material has been selected, the desired degree of rotation can be attained either by a variation of path length or magnetic field. Since a longer path entails greater loss of beam energy due to absorption, a larger field source and an increased manufacturing expense of a longer optically active element, it is usually desirable to vary the strength of the magnetic field. Permanent magnets are much more suitable as magnetic field sources than electromagnets because the permanent magnet requires no electrical power and can be fabricated into a much more compact size. Therefore, permanent magnet structures that afford high magnetic fields with minimal bulk and weight that can also provide access to a light beam and accommodation of the optically active element are desirable for these purposes. Prior art arrangements have used a series of three cylindrical magnets placed together in tandem along a mutual axis with the two end magnets placed in magnetic opposition to the central magnet. FIG. 1 is an example of that prior art arrangement.

Referring now to FIG. 1, an axially magnetized cylindrical magnet structure 10 comprises cylindrical magnets 11–13 placed together in tandem along a longitudinal axis represented by broken line 14. The two end magnets 11 and 13 are placed in magnetic opposition to central magnet 12 and optically active elements 15 are positioned within the axial tunnel 16. The optically active elements 15 within the axial tunnel 16 are exposed to an input optical beam, indicated by arrow 17, which enters the axial tunnel 16. FIG. 1 also depicts representative dimensions. The axially magnetized cylindrical magnets 11–13 have magnetic poles situated on their circular end-surfaces with N poles 18 and S poles 19. The magnetic poles have an area density given by the expression:

$$\sigma = M \quad (2)$$

where M is the magnetization. It is these magnetic poles that according to Coulomb's inverse square law give rise to an axial field in the axially bored tunnel 16 through the central magnet 12. Mounting the end magnets 11 and 13 in tandem in opposition to central cylindrical magnet 12 has the effect of doubling the surface pole density on the end-surfaces 18 and 19 and hence the magnetic field in the tunnel 16. Because the fields in successive elements are in opposite directions, it is necessary for the respective materials in the successive elements to have opposing chiralities to result in the same sense of beam rotation. In the interiors of the outside end magnets 11 and 13, the magnetic field is increased by only about ⅓ since only their inner surfaces have effective double pole density. Also their outer ends detract from the magnetic field in the central magnet 12 because of their opposite charges. However, since the end magnets 11 and 13 are considerably more remote from the center magnet 12 than the inner surface, this detraction is small when compared to the addition provided by the inner surface. The magnetic fields in the outer end magnets 11 and 13 can also be used to further augment the total optical rotation by placing optically active elements of opposite chirality from that of central magnet 12 in the axial tunnel 16 to compensate for the reversed field direction there as compared to that in the tunnel 16 of the central magnet 12. The prior art tandem arrangement 10 provides a rotation induced by a potential difference between the end magnets 11 and 13 of 16 kilo-gilberts.

The prior art tandem arrangement suffers from a number of disadvantages, limitations and shortcomings based upon the cumbersome mass and bulk of the axially magnetized cylindrical magnet structure 10, as well as the need for a relatively lengthy structure to accommodate multiple optically active elements in the axial tunnel 16. Up until now, it has not been possible to provide the benefits of a Faraday rotator mechanism without suffering from the disadvantages, limitations and shortcomings of cumbersome mass and bulk, longer optically active elements and increasingly lengthy tunnels for the longer optically active elements. The present invention provides magnetic structures for Faraday rotators with significant decreases in mass, bulk and optically active element length, without suffering from the disadvantages, limitations and shortcomings of prior art structures. One embodiment of the Faraday rotator magnetic structure comprises a magic sphere augmented by an interior magnet that produces a similar magnetic potential difference, $B_f$, the shorter length, l, being compensated by a higher field, B. Another embodiment of the Faraday rotator magnetic structure comprises positioning two magic spheres in tandem to provide an advantageous significant reduction in mass.

SUMMARY OF THE INVENTION

It is an object of the present invention to provide magnetic structures for Faraday rotators with significant decreases in mass, bulk and length of the optically active element.

It is another object of the present invention to provide magnetic structures for Faraday rotators comprising a magic sphere augmented by an interior magnet that attains significant decreases in mass, bulk and length of the optically active element.

It is yet another object of the present invention to provide magnetic structures for Faraday rotators comprising two augmented magic spheres positioned in tandem that advantageously achieves a significant reduction in mass and significant decreases in mass, bulk and length of the optically active element.

These and other objects and advantages can now be attained by this invention's augmented magic sphere rotator permanent magnetic structures that provide substantial decreases in mass, bulk and length of the optically active element, and do not suffer from the disadvantages, limitations and shortcomings of prior art structures. In one embodiment of the augmented magic sphere rotator permanent magnetic structure, the structure comprises a magic sphere that is augmented by an interior magnet that produces the same 16 kilo-Gilberts potential difference as the prior art tandem arrangement while only using an optically active element with an advantageously decreased length. A second embodiment is a multiple augmented magic sphere rotator permanent magnetic structure comprises two augmented magic spheres positioned in tandem and provides an advantageously significant reduction in mass. The augmented magic sphere rotator permanent magnetic structures of the present invention provide at least two desirable advantages over the FIG. 1 prior art tandem arrangement, specifically decreased mass and bulk of the structure and decreased total length of the optically active elements. In those cases when attaining the desirable objectives of decreased mass and bulk and decreased optically active element length are to some extent in conflict, the designer needs to weigh the relative desirability of each set of objectives on a case-by-case basis. The present invention answers the long-felt need for Faraday rotator structures with an increased magnetic field along with decreased mass, bulk and optically active element length that do not suffer from the disadvantages, shortcomings and limitations of prior art arrangements.

The FIG. 1 axially magnetized cylindrical magnet structure 10 is depicted for the sake of comparison as a specific example of a prior art tandem structure with representative dimensions.

The present invention comprises at least one magic sphere augmented by an interior magnet in a hollow core and can achieve significant decreases of more than 50% in optically active element length while still producing the same 16 kilo-gilberts potential difference of the FIG. 1 prior art structure, with attendant lossy boundaries. Additionally, the FIG. 1 prior art structure requires 42% more structural mass to achieve the same 16 kilo-gilberts potential difference as the structures of the present invention. Other mass advantages may be achieved with the less cumbersome and lighter magic sphere magnetic structures of the present invention. The magic sphere is a magnetic structure having a spherically-shaped permanent magnet shell wherein the shell has a predetermined thickness and a magnetization that varies as a function of the polar angle around the shell. The magic sphere structure is described in U.S. Pat. No. 5,382,936, entitled "Field Augmented Permanent Magnets Structures," issued on Jan. 27, 1995 to this inventor and Anup Tilak, which is incorporated herein by reference.

DETAILED DESCRIPTION OF THE DRAWINGS

Figure 2:
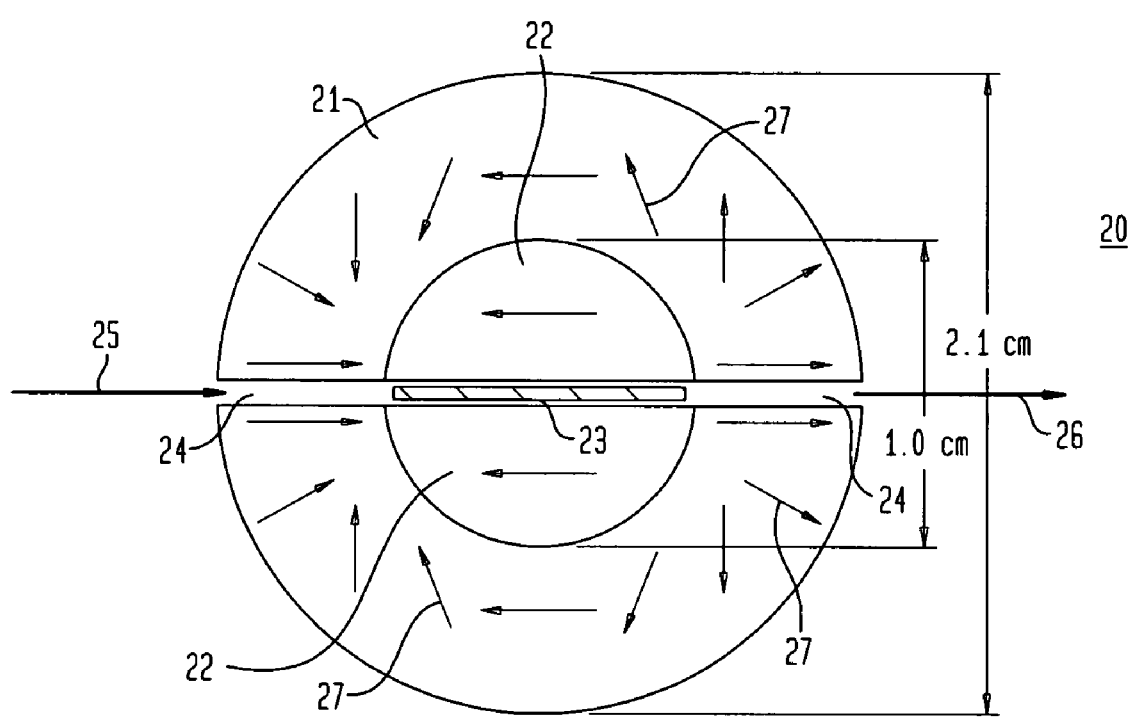
FIG. 2 is a side view of the augmented magic sphere embodiment of the present invention.

Referring now to the drawings, FIG. 2 depicts the augmented magic sphere embodiment of the present invention with an augmented magic sphere rotator permanent magnetic structure 20 comprising an interior magnet 22, a magic sphere 21 and an optically active element 23 located within an axial tunnel 24. An input optical beam is indicated by arrow 25, and an output optical beam is indicated by arrow 26. The interior magnet 22 is nested within a hollow core of the magic sphere 21. The axial tunnel 24 is positioned within the magic sphere 21 and the interior magnet 22. The axial tunnel 24 can be aligned into a passageway for optical beams to enter and exit. The magic sphere 21 having a given magic sphere magnetic field and the interior magnet 22 having a given interior magnetic field produce an increased magnetic field from nesting the interior magnet 22 within the magic sphere 21 that is greater than the given magic sphere magnetic field and the given interior magnetic field. Small arrows 27 depict magnetization directions. The input optical beam 25 travels through the axial tunnel 24 and is polarized by the increased magnetic field, resulting in a rotated output optical beam 26.

Figure 3:
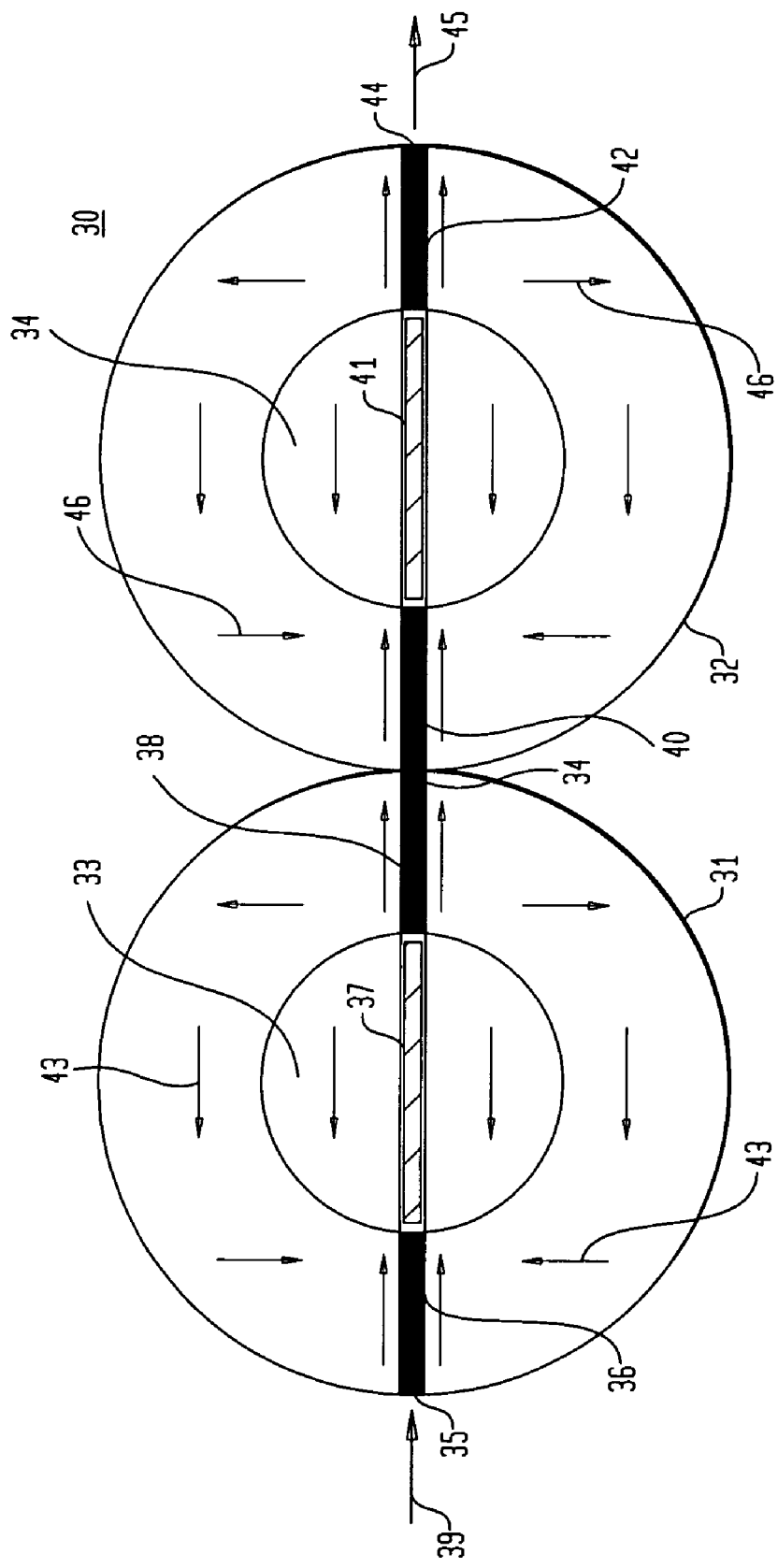
FIG. 3 is a side view of the multiple augmented magic spheres embodiment of the present invention with a pair of FIG. 2 structures arranged side-by-side in accordance with the present invention.

The magnetic material of the augmented magic sphere rotator permanent magnetic structure 20 of the present invention has a magnetic remanence of $B_r$=12 kilogauss and provides a magnetomotive force F of 16.0 KG with an augmented magic sphere 21 that is 2.1 cm wide and an interior magnet 22 that is 1.0 cm wide. It is noted that the augmented magic sphere magnetic structure 20 of the present invention can produce the same output as the FIG. 1 prior art structure with a single optically active element length of only 1.0 cm while the prior art structure requires an optical element length of about 2.47 cm, which is about two and one half times as long and requires three pieces, with the attendant disadvantage of lossy boundaries. Furthermore, the prior art structure requires 42% more structural mass to achieve the same Kilo-Gilberts magnetic force. The mass advantage of the augmented magic sphere rotator magnetic structure 20 can be even further pronounced by adding two structural elements of reverse chirality to the portions of axial tunnel 24 that traverse the magnetic sphere shell 21 at the poles. Still further mass advantage can be attained at the expense of greater total element length by the employment of several magic spheres in tandem as shown in FIG. 3, which depicts a two-sphere tandem arrangement.

If the optically active element 23 of the augmented magic sphere rotator magnetic structure 20 is positioned in the axial tunnel 24 so that the length of element 23 spans the inner diameter of the interior magnet 22, then the magnetomotive force across the optically active element 23 is given by the expression:

$$F = 2r_i \left[ \frac{4}{3} B_r \ln\left(\frac{r_o}{r_i}\right) + \frac{B_r}{3} \right] \quad (3)$$

because $2r_i$ is the length of the optically active element 23 and the expression in the brackets is the magnetic field applied to the optically active element 23 by the augmented magic sphere 21.

$$\frac{F}{2r_i} = \frac{4}{3} B_r \ln\left(\frac{r_o}{r_i}\right) + \frac{B_r}{3} \quad (4)$$

$$\frac{F}{2B_r r_i} = \frac{4}{3} \ln\left(\frac{r_o}{r_i}\right) + \frac{1}{3} \quad (5)$$

$$\frac{3F}{2B_r r_i} - 1 = (4)\ln\left(\frac{r_o}{r_i}\right) \quad (6)$$

$$\frac{3F}{8B_r r_i} - \frac{1}{4} = \ln\left(\frac{r_o}{r_i}\right) \quad (7)$$

$$e^{\left[\frac{3F}{8B_r r_i} - \frac{1}{4}\right]} = \frac{r_o}{r_i} \quad (8)$$

$$r_o = r_i e^{\left[\frac{3F}{8B_r r_i} - \frac{1}{4}\right]} \quad (9)$$

For a minimal $r_o$, the expression is:

$$\frac{dr_o}{dr_i} = 0 = r_i^{\min r_o} \left( e^{\left[\frac{3F}{8B_r r_i} - \frac{1}{4}\right]} \right) \left( -\frac{3F}{8B_r r_i^2} \right) + e^{\left[\frac{3F}{8B_r r_i} - \frac{1}{4}\right]} \quad (10)$$

$$0 = -\frac{3F}{8B_r r_i^{\min r_o}} + 1 \quad (11)$$

$$r_i^{\min r_o} = \frac{3F}{8B_r} \quad (12)$$

For a conventional system where F=16 kiloGilberts with a magnetic remanence of $B_r$=12 kilogauss, then $$r_i^{\min r_o} = \frac{3}{8} \frac{16}{12} = 0.5 \text{cm} \quad (13)$$

$$r_o^{\min} = r_i^{\min r_o} e^{\left[\frac{3F}{8B_r r_i^{\min}} - \frac{1}{4}\right]} \quad (14)$$

$$r_o^{\min} = 0.5 e^{\left(\frac{(3)(16)}{(8)(12)(0.5)} - \frac{1}{4}\right)} \quad (15)$$

$$r^{\min} = 0.5 e^{\left(1 - \frac{1}{4}\right)} = 0.5 e^{0.75} = 1.05 \quad (16)$$

And where the expression $V_M$ is minimum volume, $$V_M = \frac{4}{3} \pi (r_o^{\min})^3 = (1.333)(3.1416)(1.058) \quad (17)$$

$$V_M = 4.965 \text{ cm}^3 \quad (18)$$

Therefore, since the volume of the conventional prior art system 10 is 7.04 mm³ it is 42% larger than the augmented magic sphere 21.

Figure 1:
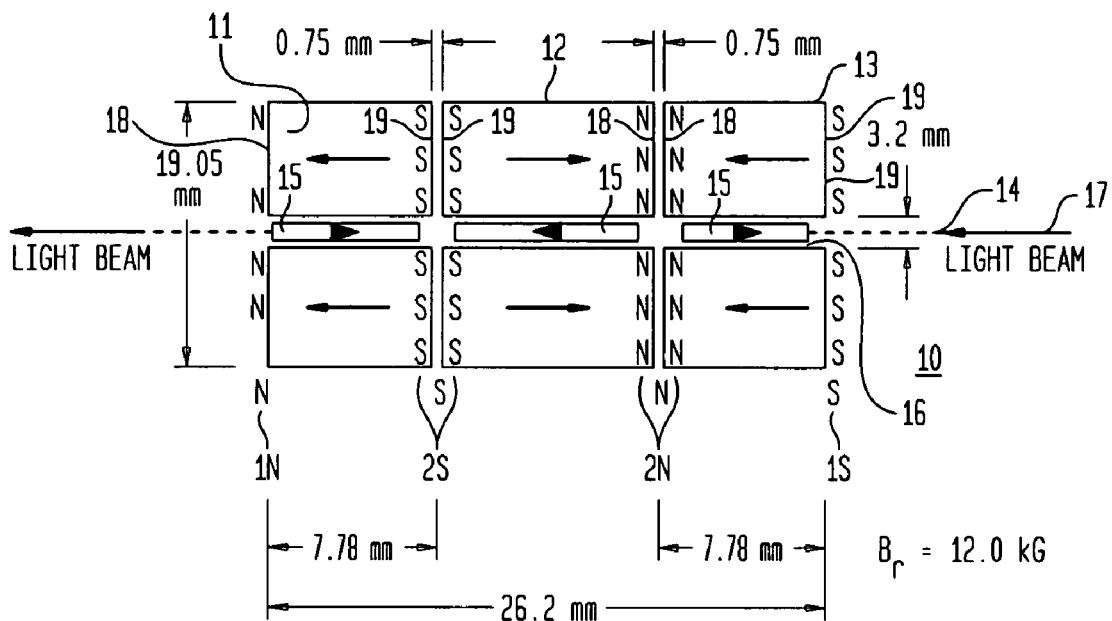
FIG. 1 is a prior art configuration of three cylindrical magnets arranged in tandem.

The augmented magic sphere magnetic structure 20 can produce the same output as the FIG. 1 prior art structure with a single optically active element length of only 1.0 cm while the prior art structure requires an optical element length of about 2.47 cm for a reduced length of 1.47 cm, or about two and one half times as long and requires using three pieces, with the attendant disadvantage of lossy boundaries. The reduced length of 1.47 cm is about 58% shorter than the 2.47 cm length of the prior art's optically active element. Furthermore, the prior art structure requires 42% more structural mass to achieve the same Kilo-Gilberts magnetic force. The reduced volume is about 29.4% (7.04−4.965=2.075 and 2.075/7.04 is 29.4%).

Any number of variations are possible with the augmented magic sphere permanent magnetic structure 20 of the present invention, including use of the structure as a Faraday rotator, the input optical beam 25 being exposed to an increased magnetic field within the optically active element 23, the input optical beam 25 being polarized after exposure to the increased magnetic field, the increased magnetic field being greater than a given interior magnetic field and a given magic sphere magnetic field, the magic sphere 21 having a 2.1 cm outer diameter and a 1.0 cm inner diameter, a reduced length for the optically active element 23 being about 58% less than the given length, a reduced volume of about 29% less than the given structural mass and positioning multiple augmented magic sphere structures in tandem.

FIG. 3 depicts a multiple augmented magic sphere rotator magnetic structure 30 comprising a pair of augmented magic spheres 31 and 32, respectively, positioned in tandem to provide an advantageously significant reduction in mass and significant decreases in bulk and optically active element length. Referring now to FIG. 3, a first augmented magic sphere 31 is located next to a second augmented magic sphere 32. A first interior magnet 33 is nested within the first magic sphere 31. A first axial tunnel 35 is positioned within the first interior magnet 33. A first left positive optically active element 36, first negative optically active element 37 and first right positive active element 38 are placed within the first axial tunnel 35 in proximity to the first augmented magic sphere 31. An input optical beam, indicated by arrow 39, penetrates the first axial tunnel 35. Small arrows 43 depict the magnetization direction of the first augmented magic sphere 31.

The second magic sphere 32, further comprises a second interior magnet 34 nested within the second magic sphere 32 that shares the axial tunnel 35. A second left positive optically active element 40, second negative optically active element 41 and second right positive active element 42 are all positioned within the second axial tunnel 44. The input optical beam 39 and an output optical beam, indicated by arrow 45, penetrate the first axial tunnel 35 and second axial tunnel 44. The first axial tunnel 35 and second axial tunnel 44 form a passageway. Small arrows 46 depict the magnetization direction for the second magnetic sphere 32. The first and second augmented magic spheres 31 and 32, respectively, arranged in tandem provide a more beneficial mass advantage than the mass of the FIG. 2 augmented magic sphere magnetic structure 20, however, this mass advantage is attained at the expense of greater total optical element length because two or more magic spheres in tandem require correspondingly longer optically active elements.

Many of the variations of the augmented magic sphere permanent magnetic structure 20 also apply to the multiple augmented magic sphere rotator magnetic structure 30 of the present invention, including use of the structure as a Faraday rotator, the input optical beam 39 being exposed to an increased magnetic field within the optically active elements 36–38 and 40–42, the input optical beam 39 being polarized after exposure to the increased magnetic fields and the increased magnetic fields being greater than the given interior magnetic fields and the given magic sphere magnetic fields and positioning multiple augmented magic sphere structures in tandem. The present invention also encompasses an augmented magic sphere permanent magnetic structure for a Faraday rotator with a number of similar variations.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, geometries, arrangements and dimensions can achieve the results described herein, without departing from the spirit and scope of this invention. Accordingly, the present invention should not be limited by the foregoing description, but only by the appended claims.

I claim:

1. An augmented magic sphere rotator permanent magnetic structure, comprising:
    an interior magnet is nested within a hollow core of a magic sphere;
    an axial tunnel is located in said interior magnet and said magic sphere;
    said interior magnet having a given interior magnetic field and said magic sphere having a given magic sphere magnetic field, said interior magnet being nested within said magic sphere having a given structural mass;
    an optically active element, having a given length, is positioned within said axial tunnel;
    said magic sphere having a generally circular magnetization direction;
    said interior magnet being nested within said magic sphere provides an augmented magic sphere magnet, said augmented magic sphere magnet generates an increased magnetic field within said optically active element;
    an input optical beam is inserted into said axial tunnel;
    said input optical beam being polarized by said increased magnetic field results in a magnetomotive force and a rotated output optical beam allowing a reduced element length and a reduced volume;
    said input optical beam being exposed to said increased magnetic field within said optically active element polarizes said input optical beam; and
    said increased magnetic field being greater than said given interior magnetic field and said given magic sphere magnetic field.

2. The augmented magic sphere rotator permanent magnetic structure, as recited in claim 1, further comprising operating said structure with a rotator.

3. The augmented magic sphere rotator permanent magnetic structure, as recited in claim 2, further comprising:
    said magic sphere having a 2.1 cm outer diameter; and
    said magic sphere having a 1.0 cm inner diameter.

4. The augmented magic sphere rotator permanent magnetic structure, as recited in claim 3, further comprising said rotator being a Faraday rotator.

5. The augmented magic sphere rotator permanent magnetic structure, as recited in claim 4, further comprising said reduced length being about 58% less than said given length.

6. The augmented magic sphere rotator permanent magnetic structure, as recited in claim 5, further comprising said reduced volume being about 29% less than said given structural mass.

7. The augmented magic sphere rotator permanent magnetic structure, as recited in claim 6, further comprising positioning a plurality of augmented magic sphere magnet structures in tandem.

8. The augmented magic sphere rotator permanent magnetic structure, as recited in claim 6, further comprising adding a plurality of structural elements with a reverse chirality to said axial tunnel to further decrease said reduced volume.

9. A multiple augmented magic sphere rotator permanent magnetic structure, comprising:
    a first augmented magic sphere magnet, further comprising a first interior magnet being nested within a hollow core of a first magic sphere;

a first axial tunnel is positioned in said first interior magnet and said first magic sphere;

said first interior magnet having a first given interior magnetic field and said first magic sphere having a first given magic sphere magnetic field, said first interior magnet being nested within said first magic sphere provides a first given structural mass;

a plurality of first optically active elements is positioned within said first axial tunnel, said plurality of first optically active elements further comprising a plurality of first positive optically active elements and a first negative optically active element, said plurality of first optically active elements having a first given length;

said first magic sphere having a generally circular first magnetization direction;

said first interior magnet being nested within said first magic sphere provides said first augmented magic sphere magnet, said first augmented magic sphere magnet generates a first increased magnetic field within said plurality of first optically active elements;

a second augmented magic sphere magnet, further comprising a second interior magnet being nested within a hollow core of a second magic sphere;

a second axial tunnel is positioned in said second interior magnet and said second magic sphere;

said second interior magnet having a second given interior magnetic field and said second magic sphere having a second given magic sphere magnetic field, said second interior magnet being nested within said second magic sphere provides a second given structural mass;

a plurality of second optically active elements is positioned within said second axial tunnel, said plurality of second optically active elements further comprising a plurality of second positive optically active elements and a second negative optically active element, said plurality of second optically active elements having a second given length;

said second magic sphere having a generally circular second magnetization direction;

said second interior magnet being nested within said second magic sphere provides said second augmented magic sphere magnet said second augmented magic sphere magnet generates a second increased magnetic field within said plurality of second optically active elements;

said first augmented magic sphere magnet is positioned in tandem with said second augmented magic sphere magnet, said first axial tunnel being aligned with said second axial tunnel to form a passageway;

said first given length and said second given length form a combined given length;

said first given structural mass and second given structural mass form a combined given structural mass;

an input optical beam is inserted into said passageway; and said input optical beam being polarized by said first increased magnetic field and said increased magnetic field results in a magnetomotive force and a rotated output optical beam allowing a reduced combined element length and a reduced combined volume.

10. The multiple augmented magic sphere rotator permanent magnetic structure, as recited in claim 9, further comprising:

said input optical beam being exposed to said first increased magnetic field within said plurality of first optically active elements;

said input optical beam being exposed to said second increased magnetic field within said plurality of second optically active elements; and said input optical beam being polarized after being exposed to said first increased magnetic field and said second increased magnetic field.

11. The multiple augmented magic sphere rotator permanent magnetic structure, as recited in claim 10, further comprising:

said first increased magnetic field being greater than said first given interior magnetic field and said first given magic sphere magnetic field; and said second increased magnetic field being greater than said second given interior magnetic field and said second given magic sphere magnetic field.

12. The multiple augmented magic sphere rotator permanent magnetic structure, as recited in claim 11, further comprising operating said structure with a Faraday rotator.

13. The multiple augmented magic sphere rotator permanent magnetic structure, as recited in claim 12, further comprising positioning a multitude of augmented magic sphere magnets in tandem.

14. An augmented magic sphere permanent magnetic structure for a Faraday rotator, comprising:

an interior magnet is nested within a hollow core of a magic sphere;

an axial tunnel having an interior magnet segment located in said interior magnet and a magic sphere segment located in said magic sphere;

said interior magnet having a given interior magnetic field and said magic sphere having a given magic sphere magnetic field, said interior magnet being nested within said magic sphere having a given structural mass;

an optically active element, having a given length, is positioned within said axial tunnel;

said magic sphere having a generally circular magnetization direction;

said interior magnet being nested within said magic sphere provides an augmented magic sphere magnet, said augmented magic sphere magnet generates an increased magnetic field within said optically active element;

an input optical beam is inserted into said axial tunnel; and said input optical beam being polarized by said increased magnetic field results in a magnetomotive force and a rotated output optical beam allowing a reduced element length and a reduced volume.

15. The augmented magic sphere rotator permanent magnetic structure for a Faraday rotator, as recited in claim 14, further comprising:

said magic sphere having a 2.1 cm outer diameter; and
said magic sphere having a 1.0 cm inner diameter.

16. The augmented magic sphere rotator permanent magnetic structure for a Faraday rotator, as recited in claim 15, further comprising said reduced length being about 58% less than said given length.

17. The augmented magic sphere rotator permanent magnetic structure for a Faraday rotator, as recited in claim 16, further comprising said reduced volume being about 29% less than said given structural mass.

18. The augmented magic sphere rotator permanent magnetic structure for a Faraday rotator, as recited in claim 17, further comprising positioning a plurality of augmented magic sphere magnets in tandem.

* * * * *